US012739439B2

(12) United States Patent
Wang

(10) Patent No.: US 12,739,439 B2
(45) Date of Patent: Sep. 15, 2026

(54) HIGH-LEVEL SYNTAX DESIGNS FOR POINT CLOUD CODING

(71) Applicant: HUAWEI TECHNOLOGIES CO., LTD., Shenzhen (CN)

(72) Inventor: Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/392,501

(22) Filed: Dec. 21, 2023

(65) Prior Publication Data

US 2024/0196017 A1 Jun. 13, 2024

Related U.S. Application Data

(63) Continuation of application No. 17/129,315, filed on Dec. 21, 2020, now Pat. No. 11,856,230, which is a continuation of application No. PCT/US2019/027066, filed on Apr. 11, 2019.

(60) Provisional application No. 62/690,132, filed on Jun. 26, 2018.

(51) Int. Cl.

| | |
|---|---|
| ***H04N 19/70*** | (2014.01) |
| ***H04N 19/103*** | (2014.01) |
| ***H04N 19/136*** | (2014.01) |
| ***H04N 19/184*** | (2014.01) |
| ***H04N 19/597*** | (2014.01) |

(52) U.S. Cl.

CPC ........... *H04N 19/70* (2014.11); *H04N 19/103* (2014.11); *H04N 19/136* (2014.11); *H04N 19/184* (2014.11); *H04N 19/597* (2014.11)

(58) Field of Classification Search

None

See application file for complete search history.

(56) References Cited

U.S. PATENT DOCUMENTS

| | | | |
|---|---|---|---|
| 9,648,321 B2 | 5/2017 | Wang et al. | |
| 9,955,159 B2 | 4/2018 | Lewis et al. | |
| 2007/0019579 A1 | 1/2007 | Xu et al. | |
| 2009/0060345 A1 | 3/2009 | Wheeler et al. | |
| 2011/0090921 A1 | 4/2011 | Anthru et al. | |
| 2012/0044999 A1 | 2/2012 | Kim et al. | |
| 2012/0056981 A1* | 3/2012 | Tian .................... | H04N 19/597 348/E13.001 |
| 2012/0163452 A1 | 6/2012 | Horowitz | |
| 2013/0121415 A1 | 5/2013 | Wahadaniah et al. | |

(Continued)

FOREIGN PATENT DOCUMENTS

| | | |
|---|---|---|
| CN | 103119944 A | 5/2013 |
| CN | 103314581 A | 9/2013 |

(Continued)

OTHER PUBLICATIONS

"First Working Draft for PCC Category 2," ISO/IEC JTC1/SC29/WG11 MPEG 2012/N17374, Jan. 2018, Gwangju, Korea, 5 pages.

(Continued)

*Primary Examiner* — Christopher Braniff

(74) *Attorney, Agent, or Firm* — Conley Rose, P.C.

(57) ABSTRACT

A method of point cloud coding (PCC) implemented by a video decoder. The method includes receiving an encoded bitstream including a group of frames header, the group of frames header specifying a profile and a level of the encoded bitstream, and decoding the encoded bitstream.

18 Claims, 6 Drawing Sheets

(56) References Cited

U.S. PATENT DOCUMENTS

2013/0188013 A1 7/2013 Chen et al.
2013/0222538 A1 8/2013 Chen et al.
2013/0229485 A1 9/2013 Rusanovskyy et al.
2013/0322531 A1 12/2013 Chen et al.
2014/0037005 A1 2/2014 Lee et al.
2014/0184740 A1 7/2014 Zhang et al.
2014/0347481 A1 11/2014 Kostrzewski et al.
2015/0053669 A1 2/2015 Rakozy
2015/0063450 A1 3/2015 Kim et al.
2015/0163505 A1 6/2015 Sato
2015/0172678 A1 6/2015 Alshina et al.
2016/0021375 A1* 1/2016 Hendry ................ H04N 19/146 375/240.02
2016/0196830 A1 7/2016 Riedmiller et al.
2016/0212446 A1 7/2016 Liu et al.
2016/0234518 A1 8/2016 Hendry et al.
2016/0241835 A1 8/2016 Ikai et al.
2017/0004649 A1 1/2017 Collet Romea et al.
2017/0094277 A1 3/2017 Chen et al.
2017/0111661 A1 4/2017 Boyce
2017/0249401 A1 8/2017 Eckart et al.
2017/0302949 A1 10/2017 Vadakital et al.
2017/0310945 A1 10/2017 Juang et al.
2017/0347055 A1 11/2017 Dore et al.
2017/0347100 A1 11/2017 Chou et al.
2017/0347120 A1 11/2017 Chou et al.
2017/0347122 A1 11/2017 Chou et al.
2018/0053324 A1 2/2018 Cohen et al.
2018/0063543 A1 3/2018 Reddy et al.
2018/0176591 A1 6/2018 Hannuksela et al.
2018/0268570 A1 9/2018 Budagavi et al.
2018/0316902 A1 11/2018 Tanaka
2018/0352219 A1 12/2018 Maze et al.
2019/0087979 A1 3/2019 Mammou et al.
2019/0158935 A1 5/2019 Denoual et al.
2019/0215532 A1* 7/2019 He ....................... H04N 13/383
2019/0313110 A1* 10/2019 Mammou ............... G06T 7/248
2020/0053392 A1 2/2020 Hannuksela
2020/0195946 A1* 6/2020 Choi .................... H04N 19/132
2020/0359035 A1 11/2020 Chevet et al.
2021/0006806 A1 1/2021 Schwarz et al.
2021/0056730 A1 2/2021 Ricard et al.

FOREIGN PATENT DOCUMENTS

CN 103581665 A 2/2014
CN 104137551 A 11/2014
CN 104240709 A 12/2014
CN 104365105 A 2/2015
CN 104484852 A 4/2015
CN 105052145 A 11/2015
CN 105992008 A 10/2016
CN 104902272 B 9/2017
CN 107851178 A 3/2018
CN 108141613 A 6/2018
EP 3780626 A1 2/2021
JP 2015053669 A 3/2015
JP 2016067009 A 4/2016
KR 20170115063 A 10/2017
WO 2014050677 A1 4/2014
WO 2017082079 A1 5/2017
WO 2019055963 A1 3/2019
WO 2019142164 A1 7/2019

OTHER PUBLICATIONS

K. Mammou, "PCC test model category 2 v1," ISO/IEC JTC1/SC29/WG11 Mpeg, N17348, 2018, 11 pages.

Zakharchenko, V., "Point Cloud Compression Core Experiment 2.7 on additional configurations of the video coding," 122. MPEG Meeting; Apr. 16, 2018-Apr. 20, 2018, San Diego; (Motion Picture Expert Group or ISO/IEC JTC1/SC29/WG11), No. N17625, Apr. 2018, XP030024252, 5 pages.

Wang, Y-K, et al., Huawei, et al., "[PCC] On V-PCC high-level syntax", Motion Picture Expert Group or ISO/IEC JTC1/SC29/WG11, MPEG2018/M44051, Oct. 1, 2018 XP030191453, 5 pages.

Liu, D., et al., "Three-Dimensional Point-Cloud Plus Patches: Towards Model-Based Image Coding in the Cloud," 2015 IEEE International Conference on Multimedia Big Data, IEEE, 2015, pp. 395-400.

Mekuria, R., et al., "Overview of the MPEG Activity on Point Cloud Compression," 2016 Data Compression Conference, IEEE, 2016, p. 620.

Mekuria, R., et al., "Design, Implementation, and Evaluation of a Point Cloud Codec for Tele-Immersive Video," IEEE Transactions on Circuits and Systems for Video Technology, IEEE, Apr. 2017, vol. 27, No. 4, pp. 828-842.

"Line Transmission of Non-Telephone Signals; Video Codec for Audiovisual Services At p x 64 kbits," ITU-T Recommendation H.261, Mar. 1993, 29 pages.

"Transmission of Non-Telephone Signals; Information Technology—Generic Coding of Moving Puctures and Associated Audio Information: Video," ITU-T Recommendation H.262, Jul. 1995, 211 pages.

"Series H: Audiovisual and Multimedia Systems Infrastructure of audiovisual services—Coding of moving video; Video coding for low bit rate communication," ITU-T Recommendation H.263, Jan. 2005, 226 pages.

"Series H: Audiovisual and Multimedia Systems Infrastructure of audiovisual services—Transmission multiplexing and synchronization; Multiplexing protocol for low bit rate multimedia communication," ITU-T Recommendation H.223, Jul. 2001, 74 pages.

"Series H: Audiovisual and Multimedia Systems; Infrastructure of audiovisual services—Coding of moving video; High efficiency video coding" Recommendation ITU-T H.265, Apr. 2013, 317 pages.

JCTVC-K0206, Boyce, J., et al., "VPS support for out-of-band signaling and hybrid codec scalability," Joint Collaborative Team on Video Coding (JCT-VC) of ITU-T SG 16 WP 3 and ISO/IEC JTC 1/SC 29/WG 11, 11th Meeting: Shanghai, CN, Oct. 10-19, 2012, 6 pages.

"Series H: Audiovisual and Multimedia Systems; Infrastructure of audiovisual services—Coding of moving video; Advanced video coding for generic audiovisual services," Recommendation ITU-T H.264, Jun. 2019, 836 pages.

Apple Inc., "[V-PCC][New proposal] Refactoring the V-PCC WD," International Organisation for Standardisation Organisation Internationale De Normalisation ISO/IEC JTC1/SC29/WG11, Coding of Moving Pictures and Audio, ISO/IEC JTC1/SC29/WG11 MPEG2018/M45148, Oct. 2018, Macau, CH, 41 pages.

Nakagami, O., "Second Working Draft for PCC Categories 1, 3," ISO/IEC JTC1/SC29/WG11 MPEG 2018/N17533, Apr. 2018, San Diego, US, 46 pages.

Mammou, K., "Working draft of Point Cloud Coding for Category 2 (Draft 1)," ISO/IEC JTC1/SC29/WG11, MPEG 2018/N17534, Apr. 2018, San Diego, US, 33 pages.

Chou, P., et al., "First Working Draft for PCC Category 1," ISO/IEC JTC1/SC29/WG11 MPEG 2012/N17373, Jan. 2018, Gwangju, Korea, 33 pages.

Mammou, K., "First Working Draft for PCC Category 2," ISO/IEC JTC1/SC29/WG11 MPEG 2012/N17374, Jan. 2018, Gwangju, Korea, 5 pages.

Wang, Y., "On PCC high-level syntax," ISO/IEC JTC1/SC29/WG11 MPEG2018/M42961, Jul. 2018, Ljubljana, SI, 4 pages.

Khaled Mammou "First version of the PCC WD Category 2," No. n17374, Apr. 15, 2018, XP030024020, total 5 pages.

* cited by examiner

HIGH-LEVEL SYNTAX DESIGNS FOR POINT CLOUD CODING

CROSS-REFERENCE TO RELATED APPLICATIONS

This patent application is a continuation of U.S. patent application Ser. No. 17/129,315 filed on Dec. 21, 2020, which is a continuation of International Application No. PCT/US2019/027066 filed on Apr. 11, 2019, which claims the benefit of U.S. Provisional Patent Application No. 62/690,132, filed Jun. 26, 2018, each of which is hereby incorporated by reference.

TECHNICAL FIELD

The present disclosure is generally related to point cloud coding, and is specifically related to the high-level syntax for point cloud coding.

BACKGROUND

The point cloud is employed in a wide variety of applications including entertainment industry, intelligent automobile navigation, geospatial inspection, three dimensional (3D) modeling of real world objects, visualization etc. Considering the non-uniform sampling geometry of the point cloud, compact representations for storage and transmission of such data is useful. Compared with the other 3D presentations, the irregular point cloud is more general and applicable for a wider range of sensors and data acquisition strategies. For example, when performing a 3D presentation in a virtual reality world or remote renderings in a tele-presence environment, the rendering of virtual figures and real-time instructions are processed as dense point cloud data set.

SUMMARY

A first aspect relates to a method of point cloud coding (PCC) implemented by a video decoder. The method includes receiving an encoded bitstream including a group of frames header, the group of frames header specifying a profile and a level of the encoded bitstream; and decoding the encoded bitstream.

A second aspect relates to a method of point cloud coding (PCC) implemented by a video encoder. The method includes generating an encoded bitstream including a group of frames header, the group of frames header specifying a profile and a level of the encoded bitstream; and transmitting the encoded bitstream toward a decoder.

The methods provide high-level syntax designs that solve one or more of the problems associated with point cloud coding as described below. Therefore, the process of video coding and the video codec are improved, more efficient, and so on.

In a first implementation form of the method according to the first or second aspect as such, the group of frames header is a group of frames network abstraction layer (NAL) unit.

In a second implementation form of the method according to the first or second aspect as such or any preceding implementation form of the first or second aspect, the group of frames header is configured to carry group of frames header parameters.

In a third implementation form of the method according to the first or second aspect as such or any preceding implementation form of the first or second aspect, at least one of occupancy information, geometry information, and attribute information are included in the group of frames header parameters.

In a fourth implementation form of the method according to the first or second aspect as such or any preceding implementation form of the first or second aspect, the group of frames header specifies the profile and the level for decoding auxiliary information for an occupancy map.

In a fifth implementation form of the method according to the first or second aspect as such or any preceding implementation form of the first or second aspect, the group of frames header specifies a point cloud reconstruction process that utilizes decoding results of geometry, texture, auxiliary information, and occupancy map.

In a sixth implementation form of the method according to the first or second aspect as such or any preceding implementation form of the first or second aspect, the profile or the level indicates capabilities for decoding of auxiliary information and occupancy map components.

In a seventh implementation form of the method according to the first or second aspect as such or any preceding implementation form of the first or second aspect, the profile or the level indicates the capabilities for point cloud reconstruction.

In an eighth implementation form of the method according to the first or second aspect as such or any preceding implementation form of the first or second aspect, the profile is a specified subset of syntax.

In a ninth implementation form of the method according to the first or second aspect as such or any preceding implementation form of the first or second aspect, the profile is a specified subset of coding tools.

In a tenth implementation form of the method according to the first or second aspect as such or any preceding implementation form of the first or second aspect, the level is a defined set of constraints on values that may be taken by syntax elements and variables.

In an eleventh implementation form of the method according to the first or second aspect as such or any preceding implementation form of the first or second aspect, a combination of the profile and the level for the encoded bitstream represents a particular decoding capability required for decoding of the encoded bitstream.

A third aspect relates to a coding apparatus that includes a receiver configured to receive a picture to encode or to receive a bitstream to decode, a transmitter coupled to the receiver, the transmitter configured to transmit the bitstream to a decoder or to transmit a decoded image to a display, a memory coupled to at least one of the receiver or the transmitter, the memory configured to store instructions, and a processor coupled to the memory, the processor configured to execute the instructions stored in the memory to perform the method of any of the preceding aspects or implementations.

The coding apparatus utilizes high-level syntax designs that solve one or more of the problems associated with point cloud coding as described below. Therefore, the process of video coding and the video codec are improved, more efficient, and so on.

In a first implementation form of the apparatus according to the third aspect as such, the apparatus further includes a display configured to display an image.

A fourth aspect relates to a system that includes an encoder and a decoder in communication with the encoder. The encoder or the decoder includes the coding apparatus of any of the preceding aspects or implementations.

The system utilizes high-level syntax designs that solve one or more of the problems associated with point cloud coding as described below. Therefore, the process of video coding and the video codec are improved, more efficient, and so on.

A fifth aspect relates to a means for coding that includes receiving means configured to receive a picture to encode or to receive a bitstream to decode, transmission means coupled to the receiving means, the transmission means configured to transmit the bitstream to a decoder or to transmit a decoded image to a display means, storage means coupled to at least one of the receiving means or the transmission means, the storage means configured to store instructions, and processing means coupled to the storage means, the processing means configured to execute the instructions stored in the storage means to perform the methods in any of the preceding aspects or implementations.

The means for coding utilizes high-level syntax designs that solve one or more of the problems associated with point cloud coding as described below. Therefore, the process of video coding and the video codec are improved, more efficient, and so on.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
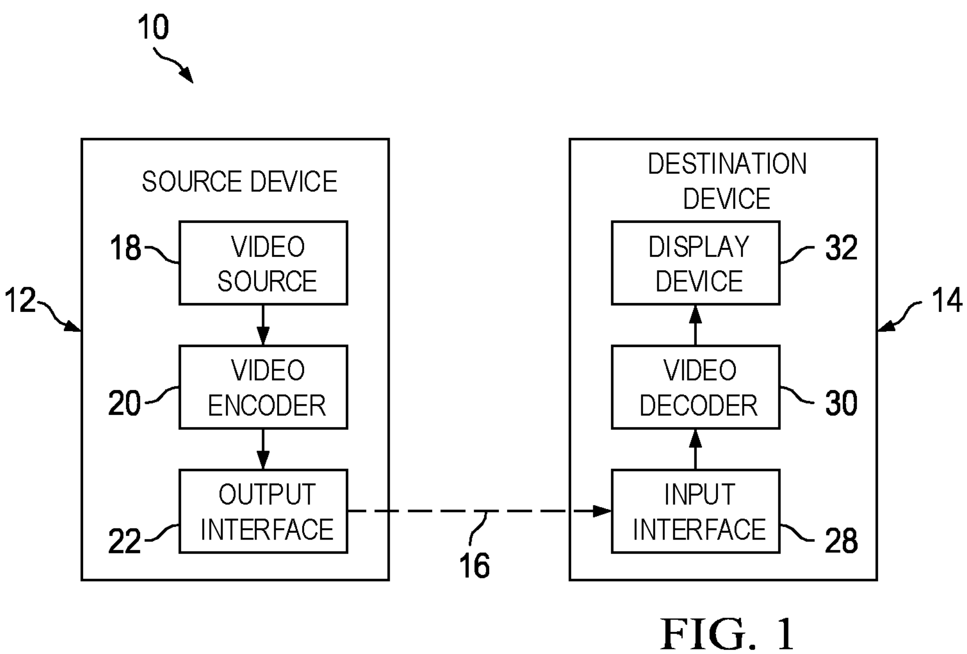
FIG. 1 is a block diagram illustrating an example coding system that may utilize context modeling techniques.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Video coding standards include International Telecommunications Union Telecommunication Standardization Sector (ITU-T) H.261, International Organization for Standardization (ISO)/International Electrotechnical Commission (IEC) Moving Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC), and Multiview Video Coding plus Depth (MVC+D), and 3D AVC (3D-AVC). HEVC includes extensions such as Scalable HEVC (SHVC), Multiview HEVC (MV-HEVC), and 3D HEVC (3D-HEVC).

A point cloud is a set of data points in the 3D space. Each data point consists of parameters that determine a position (e.g., X, Y, Z), a color (e.g., R, G, B or Y, U, V), and possibly other properties like transparency, reflectance, time of acquisition, etc. Typically, each point in a cloud has the same number of attributes attached to it. Point clouds may be used in various applications such as real-time 3D immersive telepresence, content virtual reality (VR) viewing with interactive parallax, 3D free viewpoint sports replay broadcasting, geographic information systems, cultural heritage, autonomous navigation based on large-scale 3D dynamic maps, and automotive applications.

The ISO/IEC Moving Picture Experts Group (MPEG) began in 2016 the development of a new codec standard on Point Cloud Coding for lossless and lossy compressed point cloud data with substantial coding efficiency and robustness to network environments. The use of this codec standard allows point clouds to be manipulated as a form of computer data and to be stored on various storage media, transmitted and received over existing and future networks and distributed on existing and future broadcasting channels.

Recently, the point cloud coding (PCC) work was classified into three categories, PCC category 1, PCC category 2, and PCC category 3, wherein two separate working drafts were being developed, one for PCC category 2 (PCC Cat2), and the other for PCC categories 1 and 3 (PCC Cat13). The latest working draft (WD) for PCC Cat2 is included in MPEG output document N17534, and the latest WD for PCC Cat13 is included in MPEG output document N17533.

The main philosophy behind the design of the PCC Cat2 codec in the PCC Cat2 WD is to leverage existing video codecs to compress the geometry and texture information of a dynamic point cloud, by compressing the point cloud data as a set of different video sequences. In particular, two video sequences, one representing the geometry information of the point cloud data and another representing the texture information, are generated and compressed by using video codecs. Additional metadata to interpret the two video sequences, i.e., an occupancy map and auxiliary patch information, is also generated and compressed separately.

Unfortunately, the existing designs of PCC have drawbacks. For example, data units pertaining to one time instance, i.e., one access unit (AU), are not contiguous in decoding order. In the PCC Cat 2 WD, the data units of texture, geometry, auxiliary information, and the occupancy map for each AU are interleaved in the units of group of frames. That is, the geometry data for all the frames in the group is together. The same is often true for texture data, and so on. In PCC Cat 13 WD, the data units of geometry and the general attributes for each AU are interleaved on the level of the entire PCC bitstream (e.g., the same as in PCC Cat2 WD when there is only one group of frames that has the same length as the entire PCC bitstream). Interleaving of data units belonging to one AU inherently causes a huge end-to-end delay that is at least equal to the length of the group of frames in presentation time duration in application systems.

Another drawback relates to the bitstream format. The bitstream format allows emulation of a start code pattern like 0x0003 and therefore does not work for transmission over MPEG-2 transport stream (TS) where start code emulation prevention is needed. For PCC Cat2, currently only group_of_frames_geometry_video_payload( ) and group_of_frames_texture_video_payload( ) have start code emulation prevention in place when either HEVC or AVC is used for coding of the geometry and texture components. For PCC Cat13, start code emulation prevention is not in place anywhere in the bitstream.

In PCC Cat2 WD, some of the codec information (e.g., which codec, profile, level, etc., of the codec) for the geometry and texture bitstreams is deeply buried in the multiple instances of the structures group_of_frames_geometry_video_payload( ) and group_of_frames_texture_video_ payload( ). Furthermore, some of the information like profile and level that indicates the capabilities for decoding of the auxiliary information and occupancy map components, as well as for point cloud reconstruction, is missing.

Disclosed herein are high-level syntax designs that solve one or more of the aforementioned problems associated with point cloud coding. As will be more fully explained below, the present disclosure utilizes a type indicator in a data unit header (a.k.a., a PCC network access layer (NAL) header) to specify the type of content in the payload of the PCC NAL unit. In addition, the present disclosure utilizes a group of frames header NAL unit to carry the group of frames header parameters. The group of frames header NAL unit may also be used to signal the profile and level of each geometry or texture bitstream.

FIG. 1 is a block diagram illustrating an example coding system 10 that may utilize PCC video coding techniques. As shown in FIG. 1, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, digital video disks (DVD)s, Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of the source device 12 and/or the video decoder 30 of the destination device 14 may be configured to apply the techniques for video coding. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1 is merely one example. Techniques for video coding may be performed by any digital video encoding and/or decoding device. Although the techniques of this disclosure generally are performed by a video coding device, the techniques may also be performed by a video encoder/decoder, typically referred to as a "CODEC." Moreover, the techniques of this disclosure may also be performed by a video preprocessor. The video encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video.

In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the International Telecommunications Union Telecommunication Standardization Sector (ITU-T) H.264 standard, alternatively referred to as Moving Picture Expert Group (MPEG)-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Figure 2:
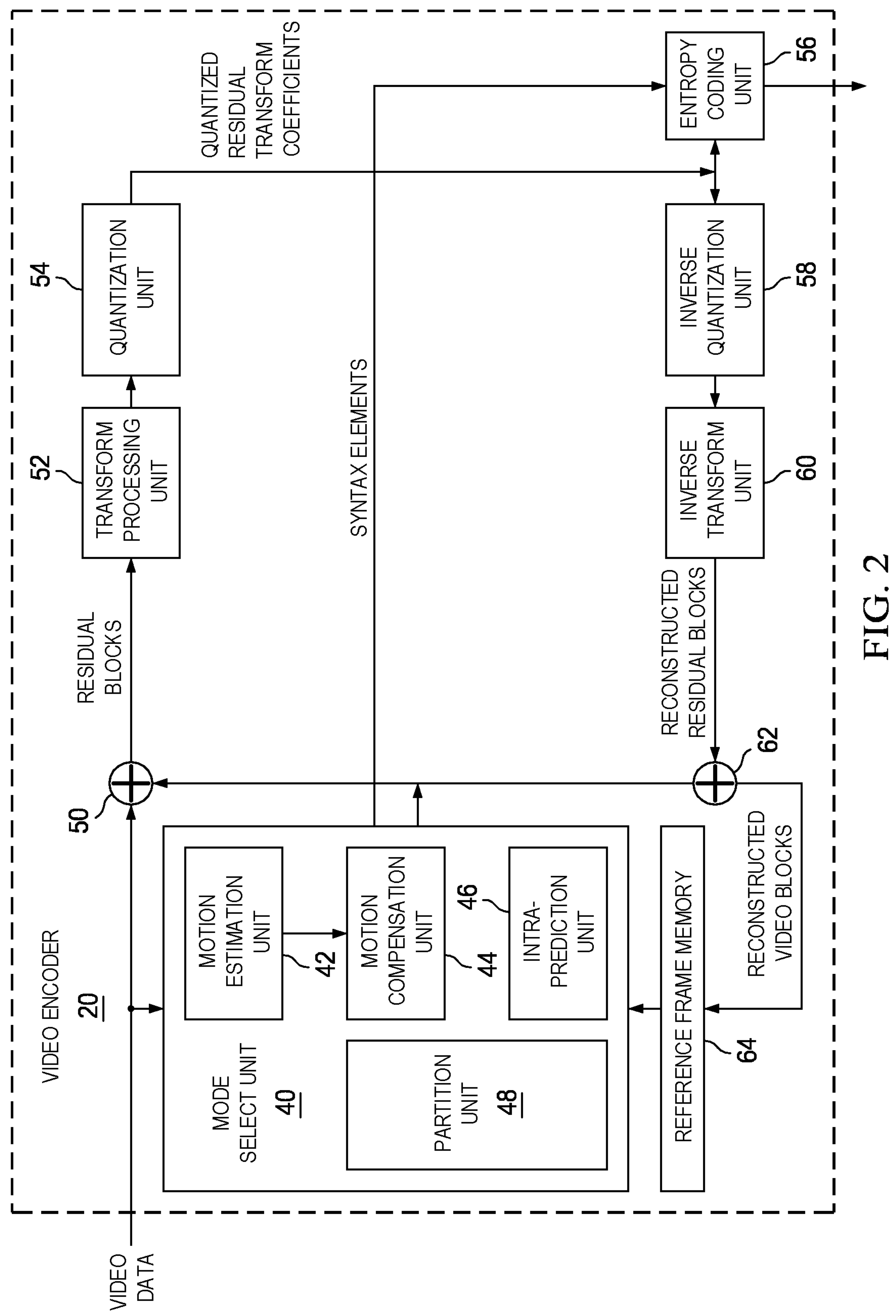
FIG. 2 a block diagram illustrating an example video encoder that may implement context modeling techniques.

FIG. 2 is a block diagram illustrating an example of video encoder 20 that may implement video coding techniques. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional (a.k.a., uni prediction) prediction (P mode) or bi-prediction (a.k.a., bi prediction) (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction (a.k.a., intra prediction) unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into largest coding units (LCUs), and partition each of the LCUs into sub-coding units (sub-CUs) based on rate-distortion analysis (e.g., rate-distortion optimization). Mode select unit 40 may further produce a quad-tree data structure indicative of partitioning of a LCU into sub-CUs. Leaf-node CUs of the quad-tree may include one or more prediction units (PUs) and one or more transform units (TUs).

The present disclosure uses the term "block" to refer to any of a CU, PU, or TU, in the context of HEVC, or similar data structures in the context of other standards (e.g., macroblocks and sub-blocks thereof in H.264/AVC). A CU includes a coding node, PUs, and TUs associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction (a.k.a., inter prediction) mode encoded. PUs may be partitioned to be non-square in shape. Syntax data associated with a CU may also describe, for example, partitioning of the CU into one or more TUs according to a quad-tree. A TU can be square or non-square (e.g., rectangular) in shape.

Mode select unit 40 may select one of the coding modes, intra- or inter-, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map using a depth modeling mode (DMM). Mode select unit 40 may determine whether an available DMM mode produces better coding results than an intra-prediction mode and the other DMM modes, e.g., using rate-distortion optimization (RDO). Data for a texture image corresponding to a depth map may be stored in reference frame memory 64. Motion estimation unit 42 and motion compensation unit 44 may also be configured to inter-predict depth blocks of a depth map.

After selecting an intra-prediction mode for a block (e.g., a conventional intra-prediction mode or one of the DMM modes), intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

Transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
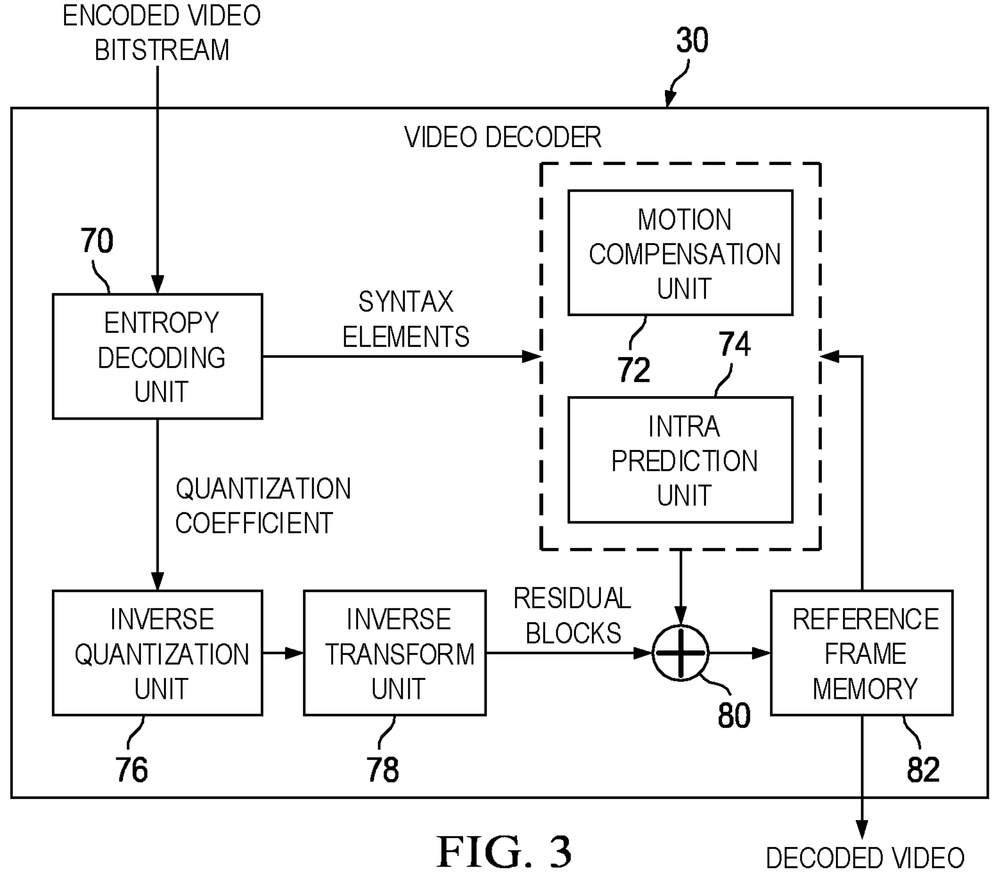
FIG. 3 a block diagram illustrating an example video decoder that may implement context modeling techniques.

FIG. 3 is a block diagram illustrating an example of video decoder 30 that may implement video coding techniques. In the example of FIG. 3, video decoder 30 includes an entropy decoding unit 70, motion compensation unit 72, intra-prediction unit 74, inverse quantization unit 76, inverse transformation unit 78, reference frame memory 82, and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of the video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra-prediction mode and data from previously decoded blocks of the current frame or picture. When the video frame is coded as an inter-coded (e.g., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Data for a texture image corresponding to a depth map may be stored in reference frame memory 82. Motion compensation unit 72 may also be configured to inter-predict depth blocks of a depth map.

Keeping the above in mind, some of the basic concepts of the present disclosure are discussed.

For PCC Cat2, to solve the first problem described above, the data units pertaining to one time instance (e.g., one access unit) should be placed contiguous in decoding order in a bitstream. Once they are placed contiguous in decoding order in the bitstream, identification of the type of each data unit allows for identification routing each data unit to the correct decoder component. The design should also avoid violating the main design behind the PCC Cat2 codec, which is to leverage existing video codecs to compress the geometry and texture information of a dynamic point cloud.

To be able to leverage existing video codecs, e.g., take HEVC as the example, to separately compress the geometry and texture information, while at the same time to have one single, self-contained PCC Cat2 bitstream, the following aspects should be clearly specified: (1) Extraction/construction a conforming HEVC bitstream for the geometry component out of the PCC Cat2 bitstream; (2) Extraction/construction a conforming HEVC bitstream for the texture component out of the PCC Cat2 bitstream; and (3) Signaling/indication of the conformance point, i.e., profile, tier, and level, of each of the extracted conforming HEVC bitstreams for the geometry and texture component.

To solve the problems described above, and to meet all the above-mentioned constraints, the present disclosure provides two alternative sets of methods related to PCC high-level syntax.

In the first set of methods, there is a common high-level syntax for all video codecs that can be used for coding of the geometry and texture component of PCC Cat2. This set of methods is summarized as follows.

Figure 4:
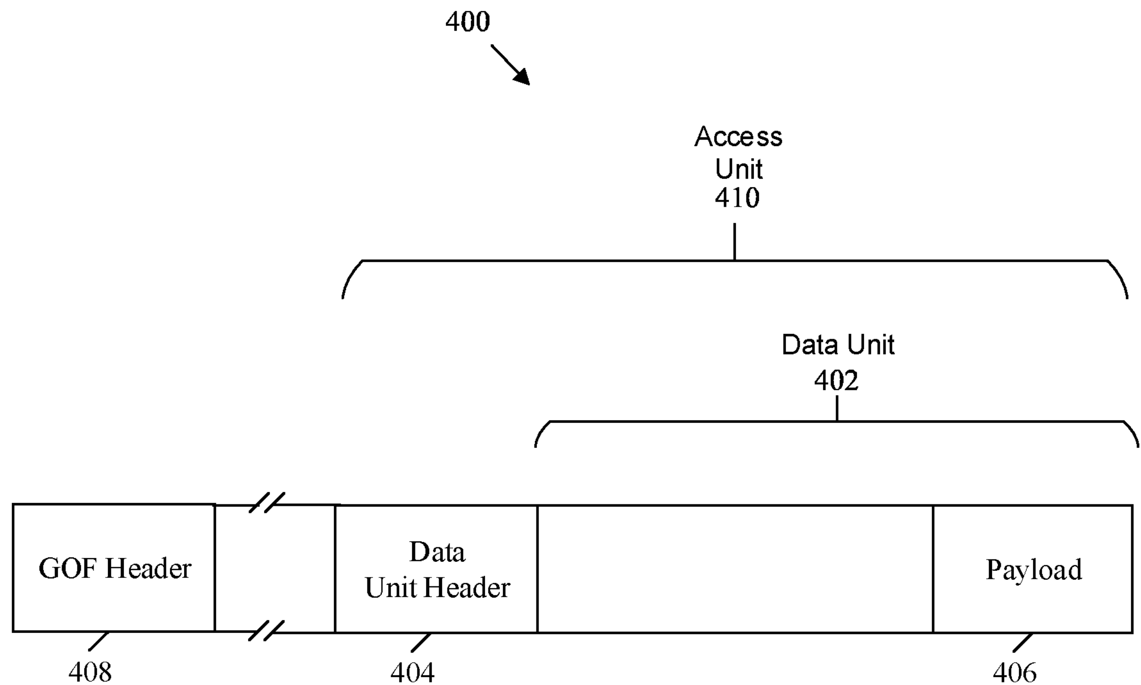
FIG. 4 is a schematic diagram of an embodiment of a data structure compatible with PCC.

FIG. 4 illustrates a data structure 400 compatible with PCC. The data structure 400 may represent a portion of a bitstream generated by an encoder and received by a decoder. As shown, a data unit header 404 (which may be referred to as a PCC NAL unit header) is added for each data unit 402 (which may be referred to as a PCC NAL unit). While one data unit 402 and one data unit header 404 are illustrated in the data structure 400 of FIG. 4, any number of data units 402 and data unit headers 404 may be included in the data structure 400 in practical applications. Indeed, a bitstream including the data structure 400 may contain a sequence of data units 402 each comprising a data unit header 404.

The data unit header 404 may comprise, for example, one or two bytes. In an embodiment, each data unit 402 is formed as one PCC NAL unit. The data unit 402 includes a payload 406. In an embodiment, the data unit 406 may also include a supplemental enhancement information (SEI) message, a sequence parameter set, a picture parameter set, slice information, etc.

In an embodiment, the payload 406 of the data unit 402 may be an HEVC unit or an AVC NAL unit. In an embodiment, the payload 406 may contain data for a geometry component or a texture component. In an embodiment, the geometry component is a set of Cartesian coordinates associated with a point cloud frame. In an embodiment, the texture component is a set of luma sample values of a point cloud frame. When HEVC is in use, the data unit 402 may be referred to as a PCC NAL unit containing an HEVC NAL unit as the payload 406. When AVC is in use, the data unit 402 may be referred to as a PCC NAL unit containing an AVC NAL unit as the payload 406.

In an embodiment, the data unit header 404 (e.g., the PCC NAL unit header) is designed as summarized below.

First, the data unit header 404 includes a type indicator. The type indicator may be, for example, 5 bits. The type indicator specifies the type of content carried in the payload 406. For example, the type indicator may specify that the payload 406 contains geometry or texture information.

In an embodiment, some of the reserved data units (which are similar to data unit 402, but have been reserved for later use) may be used for PCC Cat13 data units. Thus, the design of the present disclosure also applies to PCC Cat13. As such, it is possible to unify PCC Cat2 and PCC Cat13 into one codec standard specification.

As noted above, the current bitstream format permits emulations of a start code pattern that signals the start of, for example, a new NAL unit or PCC NAL unit. The start code pattern may be, for example, 0x0003. Because the current bitstream format permits emulations of the start code pattern, the start code may be unintentionally signaled. The present disclosure provides PCC NAL unit syntax and semantics (see below) to resolve this issue. The PCC NAL unit syntax and semantics depicted herein ensure start code emulation prevention for each PCC NAL unit regardless of its content. Consequently, the last byte of the one-byte or two-byte data unit header 404 (e.g., the data unit header itself if it is of one byte) is prohibited to be equal to 0x00.

In addition, a group of frames header 408 (a.k.a., a group of frames header NAL unit) is designed to carry the group of frames header parameters. In addition, the group of frames header NAL unit includes signaling of other global information such as, for example, the profile and level of each geometry or texture bitstream. In an embodiment, the profile is a specified subset of the syntax or a subset of coding tools. In an embodiment, the level is a defined set of constraints on the values that may be taken by the syntax elements and variables. In an embodiment, the combination of the profile and the level for a bitstream represents a particular decoding capability required for decoding of the bitstream. Furthermore, when profiles and levels are also defined for decoding of auxiliary information, occupancy map, and the point cloud reconstruction process (which utilizes the decoding results of geometry, texture, auxiliary information, and occupancy map), that profile and level are also signaled in the group of frames header 408. In an embodiment, the PCC auxiliary information refers to information like patch information and point local reconstruction information, which is used for reconstruction of the point cloud signal from a PCC coded bitstream. In an embodiment, the PCC occupancy map refers to information on which parts of the 3D space are occupied by objects from which texture values and other attributes are sampled.

As shown by the syntax below, the constraints on the order of different types of data units 402 (a.k.a., PCC NAL units) are clearly specified. In addition, the start of an access unit 410 (which may contain several of the data units 402, data unit headers 404, etc.) is clearly specified.

In addition, the process for extraction/construction of each geometry or texture bitstream is clearly specified in the syntax and/or semantics noted below.

In the second set of methods, different overall syntaxes are used for different video codecs. PCC Cat2 using HEVC for coding of geometry and texture is specified as an amendment to HEVC, while PCC Cat2 using AVC for coding of geometry and texture is specified as an amendment to AVC. This set of methods is summarized as follows.

For PCC Cat2 using HEVC for coding of geometry and texture, geometry and texture are considered as three separate layers (e.g., two layers for geometry, d0 and d1, and one layer for texture). Either SEI messages or new types of NAL units are used for the occupancy map and the auxiliary information. Two new SEI messages, one for occupancy map and one for auxiliary information, are specified. Another SEI message, sequence-level, is specified to carry the group of frames header parameters and other global information. This SEI message is similar to the group of frames header 408 in the first set of methods.

For PCC Cat2 using AVC for coding of geometry and texture, geometry and texture are considered as three separate layers (e.g., two layers for geometry, d0 and d1, and one layer for texture). Either SEI messages or new types of NAL units are used for the occupancy map and the auxiliary patch information. The extraction of an independently coded non-base layer and signaling of the conformance point (e.g., profile and level) as a single-layer bitstream are specified. Two new types of SEI messages, one for the occupancy map and one for the auxiliary information, are specified. Another SEI message, sequence-level, is specified to carry the group of frames header parameters and other global information. This SEI message is similar to the group of frames header 408 in the first set of methods.

The first set of methods noted above can be implemented based on the definitions, abbreviations, syntax, and semantics disclosed below. Aspects that are not specifically mentioned are the same as in the latest PCC Cat2 WD.

The following definitions apply.

bitstream: A sequence of bits that forms the representation of coded point cloud frames and associated data forming one or more CPSs.

byte: A sequence of 8 bits, within which, when written or read as a sequence of bit values, the left-most and right-most bits represent the most and least significant bits, respectively.

coded PCC sequence (CPS): A sequence of PCC AUs that comprises, in decoding order, of a PCC Intra Random Access Pictures (IRAP) AU, followed by zero or more PCC AUs that are not PCC IRAP AUs, including all subsequent PCC AUs up to but not including any subsequent PCC AU that is a PCC IRAP AU.

decoding order: The order in which syntax elements are processed by the decoding process.

decoding process: The process specified in this specification (a.k.a., the PCC Cat2 WD) that reads a bitstream and derives decoded point cloud frames from it.

group of frames header NAL unit: A PCC NAL unit that has PccNalUnitType equal to GOF_HEADER.

PCC AU: A set of PCC NAL units that are associated with each other according to a specified classification rule, are consecutive in decoding order, and contain all PCC NAL units pertaining to one particular presentation time.

PCC IRAP AU: A PCC AU that contains a group of frames header NAL unit.

PCC NAL unit: A syntax structure containing an indication of the type of data to follow and bytes containing that data in the form of an RBSP interspersed as needed with emulation prevention bytes.

raw byte sequence payload (RBSP): A syntax structure containing an integer number of bytes that is encapsulated in a PCC NAL unit and that is either empty or has the form of a string of data bits (SODB) containing syntax elements followed by an RBSP stop bit and zero or more subsequent bits equal to 0.

raw byte sequence payload (RBSP) stop bit: A bit equal to 1 present within a RBSP after a SODB, for which the location of the end within an RBSP can be identified by searching from the end of the RBSP for the RBSP stop bit, which is the last non-zero bit in the RBSP.

SODB: A sequence of some number of bits representing syntax elements present within a RBSP prior to the RBSP stop bit, where the left-most bit is considered to be the first and most significant bit, and the right-most bit is considered to be the last and least significant bit.

syntax element: An element of data represented in the bitstream.

syntax structure: Zero or more syntax elements present together in the bitstream in a specified order.

video AU: An access unit per a particular video codec.

video NAL unit: A PCC NAL unit that has PccNalUnitType equal to GEOMETRY_D0, GEOMETRY_D1, or TEXTURE_NALU.

The following abbreviations apply:

AU Access Unit

CPS Coded PCC Sequence

IRAP Intra Random Access Point

NAL Network Abstraction Layer

PCC Point Cloud Coding

RBSP Raw Byte Sequence Payload

SODB String Of Data Bits

The following provides the syntax, semantics, and sub-bitstream extraction process. In that regard, the syntax in clause 7.3 of the latest PCC Cat2 WD is replaced by the following.

The PCC NAL unit syntax is provided. In particular, the general PCC NAL unit syntax is as follows.

| | Descriptor |
|---|---|
| pcc_nal_unit( NumBytesInNalUnit ) { | |
| pcc_nal_unit_header( ) | |
| NumBytesInRbsp = 0 | |
| for( i = 1; i < NumBytesInNalUnit; i++ ) | |
| if( i + 2 < NumBytesInNalUnit && next_bits( 24 ) = = 0x000003 ) { | |
| rbsp_byte[ NumBytesInRbsp++ ] | b(8) |
| rbsp_byte[ NumBytesInRbsp++ ] | b(8) |
| i += 2 | |
| emulation_prevention_three_byte /* equal to 0x03 */ | f(8) |
| } else | |
| rbsp_byte[ NumBytesInRbsp++ ] | b(8) |
| } | |

The PCC NAL unit header syntax is as follows.

| | Descriptor |
|---|---|
| pcc_nal_unit_header( ) { | |
| forbidden_zero_bit | f(1) |
| pcc_nuh_reserved_zero_2bits | f(2) |
| pcc_nal_unit_type_plus1 | u(5) |
| } | |

The raw byte sequence payloads, trailing bits, and byte alignment syntax is provided. In particular, the group of frames RBSP syntax is as follows.

| | Descriptor |
|---|---|
| group_of_frames_header_rbsp( ) { | |
| identified_codec | u(8) |
| pcc_profile_level( ) | |
| frame_width | u(16) |
| frame_height | u(16) |

-continued

| | Descriptor |
|---|---|
| occupancy_resolution | u(8) |
| radius_to_smoothing | u(8) |
| neighbor_count_smoothing | u(8) |
| radius2_boundary_detection | u(8) |
| threshold_smoothing | u(8) |
| lossless_geometry | u(8) |
| lossless_texture | u(8) |
| no_attributes | u(8) |
| lossless_geometry_444 | u(8) |
| absolute_d1_coding | u(8) |
| binary_arithmetic_coding | u(8) |
| gof_header_extension_flag | u(1) |
| if( gof_header_extension_flag ) | |
| while( more_rbsp_data( ) ) | |
| gof_header_extension_data_flag | u(1) |
| rbsp_trailing_bits( ) | |
| } | |

The auxiliary information frame RBSP syntax is as follows.

| | Descriptor |
|---|---|
| auxiliary_information_frame_rbsp( ) { | |
| patch_count | u(32) |
| occupancy_precision | u(8) |
| max_candidate_Count | u(8) |
| bit_count_u0 | u(8) |
| bit_count_v0 | u(8) |
| bit_count_u1 | u(8) |
| bit_count_v1 | u(8) |
| bit_count_d1 | u(8) |
| occupancy_aux_stream_size | u(32) |
| for( i = 0; i < patchCount; i++ ) { | |
| patchList[i].patch_u0 | ae(v) |
| patchList[i].patch_v0 | ae(v) |
| patchList[i].patch_u1 | ae(v) |
| patchList[i].patch_v1 | ae(v) |
| patchList[i].patch_d1 | ae(v) |
| patchList[i].delta_size_u0 | se(v) |
| patchList[i].delta_size_v0 | se(v) |
| patchList[i].normal_axis | ae(v) |
| } | |
| for( i = 0; i < blockCount; i++ ) { | |
| if( candidatePatches[i].size( ) == 1 ) | |
| blockToPatch[i] = candidatePatches[i][0] | |
| else { | |
| candidate_index | ae(v) |
| if( candidate_index == max_candidate_count ) | |
| blockToPatch[i] = patch_index | ae(v) |
| else | |
| blockToPatch[i] = candidatePatches[i][candidate_index] | |
| } | |
| } | |
| rbsp_trailing_bits( ) | |
| } | |

The occupancy map frame RBSP syntax is as follows.

| | Descriptor |
|---|---|
| occupancy_map_frame_rbsp( ) { | |
| for( i = 0; i < blockCount; i++ ) { | |
| if( blockToPatch[i] ) { | |
| is_full | ae(v) |
| if( !is_full ) { | |
| best_traversal_order_index | ae(v) |
| run_count_prefix | ae(v) |
| if ( run_count_prefix > 0 ) | |
| run_count_suffix | ae(v) |
| occupancy | ae(v) |

-continued

```
                                                        Descriptor
            for( j = 0; j <= runCountMinusTwo+1; j++ )
                run_length_idx                          ae( )
        }
    }
  }
  rbsp_trailing_bits( )
}
```

The RBSP trailing bits syntax in clause 7.3.2.11 of the HEVC specification applies. Likewise, the byte alignment syntax in clause 7.3.2.12 of the HEVC specification applies. The PCC profile and level syntax are as follows.

```
                                                        Descriptor
pcc_profile_level( ) {
    pcc_profile_idc                                     u(5)
    pcc_pl_reserved_zero_19bits                         u(19)
    pcc_level_idc                                       u(8)
    if( identified_codec = = CODEC_HEVC ) {
        hevc_ptl_12bytes_geometry                       u(96)
        hevc_ptl_12bytes_texture                        u(96)
    }
    else if( identified_codec = = CODEC_AVC ) {
        avc_pl_3bytes_geometry                          u(24)
        avc_pl_3bytes_texture                           u(24)
    }
}
```

The semantics in clause 7.4 of the latest PCC Cat2 WD is replaced by the following and its sub-clauses.

In general, semantics associated with the syntax structures and with the syntax elements within these structures are specified in this subclause. When the semantics of a syntax element are specified using a table or a set of tables, any values that are not specified in the table(s) shall not be present in the bitstream unless otherwise specified.

The PCC NAL unit semantics are discussed. For the general PCC NAL unit semantics, the general NAL unit semantics in clause 7.4.2.1 of the HEVC specification apply. The PCC NAL unit header semantics are as follows.

forbidden_zero_bit shall be equal to 0.

pcc_nuh_reserved_zero_2bits shall be equal to 0 in bitstreams conforming to this version of this specification. Other values for pec_nuh_reserved_zero_2bits are reserved for future use by ISO/IEC. Decoders shall ignore the value of pec_nuh_reserved_zero_2bits.

pcc_nal_unit_type_plus1 minus 1 specifies the value of the variable PccNalUnitType, which specifies the type of RBSP data structure contained in the PCC NAL unit as specified in Table 1 (see below). The variable NalUnitType is specified as follows:

PccNalUnitType=pec_category2_nal_unit_type_plus1−1     (7-1)

PCC NAL units that have nal_unit_type in the range of UNSPEC25 . . . UNSPEC30, inclusive, for which semantics are not specified, shall not affect the decoding process specified in this specification.

NOTE 1—PCC NAL unit types in the range of UNSPEC25 . . . UNSPEC30 may be used as determined by the application. No decoding process for these values of PccNalUnitType is specified in this specification. Since different applications might use these PCC NAL unit types for different purposes, particular care must be exercised in the design of encoders that generate PCC NAL units with these PccNalUnitType values, and in the design of decoders that interpret the content of PCC NAL units with these PccNalUnitType values. This specification does not define any management for these values. These PccNalUnitType values might only be suitable for use in contexts in which "collisions" of usage (e.g., different definitions of the meaning of the PCC NAL unit content for the same PccNalUnitType value) are unimportant, or not possible, or are managed—e.g., defined or managed in the controlling application or transport specification, or by controlling the environment in which bitstreams are distributed.

For purposes other than determining the amount of data in the decoding units of the bitstream, decoders shall ignore (remove from the bitstream and discard) the contents of all PCC NAL units that use reserved values of PccNalUnitType.

NOTE 2—This requirement allows future definition of compatible extensions to this specification.

TABLE 1

PCC NAL unit type codes

| PccNalUnitType | Name of PccNalUnitType | Content of PCC NAL unit and/or RBSP syntax structure |
|---|---|---|
| 0 | GOF_HEADER | Group of frames header group_of_frames_header_rbsp( ) |
| 1 | AUX_INFO | Auxiliary information frame auxiliary_info_frame_rbsp( ) |
| 2 | OCP_MAP | Occupancy map frame occupancy_map_frame_rbsp( ) |
| 3 | GEOMETRY_D0 | The payload of this PCC NAL unit contains a NAL unit of the geometry d0 component per the identified video codec. |
| 4 | GEOMETRY_D1 | The payload of this PCC NAL unit contains a NAL unit of |

TABLE 1-continued

| PCC NAL unit type codes | | |
|---|---|---|
| PccNalUnitType | Name of PccNalUnitType | Content of PCC NAL unit and/or RBSP syntax structure |
| | | the geometry d1 component per the identified video codec. |
| 5 | TEXTURE_NALU | The payload of this PCC NAL unit contains a NAL unit of the texture component per the identified video codec. |
| 6 . . . 24 | RSV_6 . . . RSV_24 | Reserved |
| 25 . . . 30 | UNSPEC25 . . . UNSPEC30 | Unspecified |

NOTE 3—The identified video codec (e.g., HEVC or AVC) is indicated in the group of frames header NAL unit that is present in the first PCC AU of each CPS.

Encapsulation of an SODB within an RBSP (informative) is provided. In that regard, clause 7.4.2.3 of the HEVC specification applies.

The order of PCC NAL units and association to AUs and CPSs is provided. In general, this clause specifies constraints on the order of PCC NAL units in the bitstream.

Any order of PCC NAL units in the bitstream obeying these constraints is referred to in the text as the decoding order of PCC NAL units. Within a PCC NAL unit that is not a video NAL unit, the syntax in clause 7.3 specifies the decoding order of syntax elements. Within a video NAL unit, the syntax specified in the specification of the identified video codec specifies the decoding order of syntax elements. Decoders are capable of receiving PCC NAL units and their syntax elements in decoding order.

The order of PCC NAL units and their association to PCC AUs is provided.

This clause specifies the order of PCC NAL units and their association to PCC AUs.

A PCC AU comprises of zero or one group of frames header NAL unit, one geometry d0 video AU, one geometry d1 video AU, one auxiliary information frame NAL unit, one occupancy map frame NAL unit, and one texture video AU, in the order listed.

Association of NAL units to a video AU and the order of NAL units within a video AU are specified in the specification of the identified video codec, e.g., HEVC or AVC. The identified video codec is indicated in the frames header NAL unit that is present in the first PCC AU of each CPS.

The first PCC AU of each CPS starts with a group of frames header NAL unit, and each group of frames header NAL unit specifies the start of a new PCC AU.

Other PCC AUs start with the PCC NAL unit that contains the first NAL unit of a geometry d0 video AU. In other words, the PCC NAL unit that contains the first NAL unit of a geometry d0 video AU, when not preceded by a group of frames header NAL unit, starts a new PCC AU.

The order of PCC AUs and their association to CPSs is provided.

A bitstream conforming to this specification consists of one or more CPSs.

A CPS comprises consists of one or more PCC AUs. The order of PCC NAL units and their association to PCC AUs is described in clause 7.4.2.4.2.

The first PCC AU of a CPS is a PCC IRAP AU.

The raw byte sequence payloads, trailing bits, and byte alignment semantics are provided. The group of frames header RBSP semantics are as follows.

identified_codec specifies the identified video codec used for coding of the geometry and texture components as shown in Table 2.

TABLE 2

| Specification of identified_codec | | |
|---|---|---|
| identified_codec | Name of identified_codec | The identified video codec |
| 0 | CODEC_HEVC | ISO/IEC IS 23008-2 (HEVC) |
| 1 | CODEC_AVC | ISO/IEC IS 14496-10 (AVC) |
| 2 . . . 63 | CODEC_RSV_2 . . . CODEC_RSV_63 | Reserved |

frame_width indicates the frame width, in pixels, of the geometry and texture videos. It shall be multiple of occupancyResolution.

frame_height indicates the frame height, in pixels, of the geometry and texture videos. It shall be multiple of occupancyResolution.

occupancy_resolution indicates the horizontal and vertical resolution, in pixels, at which patches are packed in the geometry and texture videos. It shall be an even value multiple of occupancyPrecision.

radius_to_smoothing indicates the radius to detect neighbours for smoothing. The value of radius_to_smoothing shall be in the range of 0 to 255, inclusive.

neighbor_count_smoothing indicates the maximum number of neighbors used for smoothing. The value of neighbor_count_smoothing shall be in the range of 0 to 255, inclusive.

radius2_boundary_detection indicates the radius for boundary point detection. The value of radius2_boundary_detection shall be in the range of 0 to 255, inclusive.

threshold_smoothing indicates the smoothing threshold. The value of threshold_smoothing shall be in the range of 0 to 255, inclusive.

lossless_geometry indicates lossless geometry coding. The value of lossless_geometry equal to 1 indicates that point cloud geometry information is coded losslessly. The value of lossless_geometry equal to 0 indicates that point cloud geometry information is coded in a lossy manner.

lossless_texture indicates lossless texture encoding. The value of lossless_texture equal to 1 indicates that point cloud texture information is coded losslessly. The value of lossless_texture equal to 0 indicates that point cloud texture information is coded in a lossy manner.

no_attributes indicates whether to attributes are coded along with geometry data. The value of no_attributes equal to 1 indicates that the coded point cloud bitstream does not contain any attributes information. The value of no_attributes equal to 0 indicates that the coded point cloud bitstream contains attributes information.

lossless_geometry_444 indicates whether to use 4:2:0 or 4:4:4 video format for geometry frames. The value of lossless_geometry_444 equal to 1 indicates that the geometry video is coded in 4:4:4 format. The value of lossless_geometry_444 equal to 0 indicates that the geometry video is coded in 4:2:0 format.

absolute_d1_coding indicates how the geometry layers other than the layer nearest to the projection plane are coded. absolute_d1_coding equal to 1 indicates that the actual geometry values are coded for the geometry layers other than the layer nearest to the projection plane. absolute_d1_coding equal to 0 indicates that the geometry layers other than the layer nearest to the projection plane are coded differentially.

bin_arithmetic_coding indicates whether binary arithmetic coding is used. The value of bin_arithmetic_coding equal to 1 indicates that binary arithmetic coding is used for all the syntax elements. The value of bin_arithmetic_coding equal to 0 indicates that non-binary arithmetic coding is used for some syntax elements.

gof_header_extension_flag equal to 0 specifies that no gof_header_extension_data_flag syntax elements are present in the group of frames header RBSP syntax structure. gof_header_extension_flag equal to 1 specifies that there are gof_header_extension_data_flag syntax elements present in the group of frames header RBSP syntax structure. Decoders shall ignore all data that follow the value 1 for gof_header_extension_flag in a group of frames header NAL unit.

gof_header_extension_data_flag may have any value. Its presence and value do not affect decoder conformance. Decoders shall ignore all gof_header_extension_data_flag syntax elements.

The auxiliary information frame RBSP semantics are provided.

patch_count is the number of patches in the geometry and texture videos. It shall be larger than 0.

occupancy_precision is the horizontal and vertical resolution, in pixels, of the occupancy map precision. This corresponds to the sub-block size for which occupancy is signaled. To achieve lossless coding of occupancy map this should be set to size 1.

max_candidate_count specifies the maximum number of candidates in the patch candidate list.

bit_count_u0 specifies the number of bits for fixed-length coding of patch_u0.

bit_count_v0 specifies the number of bits for fixed-length coding of patch_v0.

bit_count_u1 specifies the number of bits for fixed-length coding of patch_u1.

bit_count_v1 specifies the number of bits for fixed-length coding of patch_v1.

bit_count_d1 specifies the number of bits for fixed-length coding of patch_d1.

occupancy_aux_stream_size is the number of bytes used for coding patch information and occupancy map.

The following syntax elements are specified once per patch.

patch_u0 specifies the x-coordinate of the top-left corner sub-block of size occupancy_resolution×occupancy_resolution of the patch bounding box. The value of patch_u0 shall be in the range of 0 to frame_width/occupancy_resolution−1, inclusive.

patch_v0 specifies the y-coordinate of the top-left corner sub-block of size occupancy_resolution×occupancy_resolution of the patch bounding box. The value of patch_v0 shall be in the range of 0 to frame_height/occupancy_resolution−1, inclusive.

patch_u1 specifies the minimum x-coordinate of the 3D bounding box of patch points. The value of patch_u1 shall be in the range of 0 to frame_width−1, inclusive.

patch_v1 is the minimum y-coordinate of the 3D bounding box of patch points. The value of patch_v1 shall be in the range of 0 to frameHeight−1, inclusive.

patch_d1 specifies the minimum depth of the patch. The value of patch_d1 shall be in the range of 0 to <255?>, inclusive.

delta_size_u0 is the difference of patch width between the current patch and the previous one. The value of delta_size_u0 shall be in the range of <.−65536.?> to <65535?>, inclusive.

delta_size_v0 is the difference of patch height between the current patch and the previous one. The value of delta_size_v0 shall be in the range of <−65536?.> to <0.65535?.>, inclusive.

normal_axis specifies the plane projection index. The value of normal_axis shall be in the range of 0 to 2, inclusive. normalAxis values of 0, 1, and 2 correspond to the X, Y, and Z projection axis, respectively.

The following syntax elements are specified once per block.

candidate_index is the index into the patch candidate list. The value of candidate_index shall be in the range of 0 to max_candidate_count, inclusive.

patch_index is an index to a sorted patch list, in descending size order, associated with a frame.

The group of frames occupancy map semantics is provided.

The following syntax elements are provided for non-empty blocks.

is_full specifies whether the current occupancy block of size occupancy_resolution×occupancy_resolution block is full. is_full equal to 1 specifies that the current block is full. is_full equal to 0 specifies that the current occupancy block is not full.

best_traversal_order_index specifies the scan order for sub-blocks of size occupancy_precision×occupancy_precision in the current occupancy_resolution×occupancy_resolution block. The value of best_traversal_order_index shall be in the range of 0 to 4, inclusive.

run_count_prefix is used in the derivation of variable runCountMinusTwo.

run_count_suffix is used in the derivation of variable runCountMinusTwo. When not present, the value of run_count_suffix is inferred to be equal to 0.

When the value of blockToPatch for a particular block is not equal to zero and the block is not full, runCountMinusTwo plus 2 represents the number of signalled runs for a block. The value of runCountMinusTwo shall be in the range of 0 to (occupancy_resolution*occupancy_resolution)−1, inclusive.

runCountMinusTwo is derived as follows:

runCountMinusTwo=(1<<run_count_prefix)−1+run_count_suffix (7-85)

occupancy specifies the occupancy value for the first sub-block (of occupancyPrecision×occupancyPrecision pixels). occupancy equal to 0 specifies that the first sub-block is empty. occupancy equal to 1 specifies that the first sub-block is occupied.

run_length_idx is indication of the run length. The value of runLengthIdx shall be in the range of 0 to 14, inclusive.

The variable runLength is derived from run_length_idx by using Table 3.

TABLE 3

Derivation of runLength from run_length_idx

| run_length_idx | runLength |
|---|---|
| 0 | 0 |
| 1 | 1 |
| 2 | 2 |
| 3 | 3 |
| 4 | 7 |
| 5 | 11 |
| 6 | 14 |
| 7 | 5 |
| 8 | 13 |
| 9 | 9 |
| 10 | 6 |
| 11 | 10 |
| 12 | 12 |
| 13 | 4 |
| 14 | 8 |

NOTE—The occupancy map is shared by both geometry and texture video.

The RBSP trailing bits semantics in clause 7.4.3.11 of the HEVC specification apply. The byte alignment semantics in clause 7.4.3.12 of the HEVC specification also apply. The PCC profile and level semantics are as follows.

pec_profile_idc indicates a profile to which the CPS conforms as specified in Annex A. Bitstreams shall not contain values of pcc_profile_idc other than those specified in Annex A. Other values of pec_profile_idc are reserved for future use by ISO/IEC.

pec_pl_reserved_zero_19bits shall be equal to 0 in bitstreams conforming to this version of this specification. Other values for pec_pl_reserved_zero_19bits are reserved for future use by ISO/IEC. Decoders shall ignore the value of pec_pl_reserved_zero_19bits.

pcc_level_idc indicates a level to which the CPS conforms as specified in Annex A. Bitstreams shall not contain values of pec_level_idc other than those specified in Annex A. Other values of pec_level_idc are reserved for future use by ISO/IEC.

hevc_ptl_12 bytes_geometry shall be equal to the value of the 12 bytes from generalprofile_idc to general_level_idc, inclusive, in the active SPS when a geometry HEVC bitstream extracted as specified in clause 10 is decoded by a conforming HEVC decoder.

hevc_ptl_12 bytes_texture shall be equal to the value of the 12 bytes from generalprofile_idc to general_level_ide, inclusive, in the active SPS when a texture HEVC bitstream extracted as specified in clause 10 is decoded by a conforming HEVC decoder.

avc_pl_3ytes_geometry shall be equal to the value of the 3 bytes from profile_idc to level_idc, inclusive, in the active SPS when a geometry AVC bitstream extracted as specified in clause 10 is decoded by a conforming AVC decoder.

avc_pl_3ytes_texture shall be equal to the value of the 3 bytes from profile_idc to level_idc, inclusive, in the active SPS when a texture AVC bitstream extracted as specified in clause 10 is decoded by a conforming AVC decoder.

The sub-bitstream extraction process in clause 104 of the latest PCC Cat2 WD is replaced by the following. For the sub-bitstream extraction process, inputs are a bitstream, a target video component indication of geometry d0, geometry d1, or texture component. The output of this process is a sub-bitstream.

In an embodiment, it is a requirement of bitstream conformance for the input bitstream that any output sub-bitstream that is the output of the process specified in this clause with a conforming PCC bitstream and any value of the target video component indication shall be a conforming video bitstream per the identified video codec.

The output sub-bitstream is derived by the following ordered steps.

Depending on the value of the target video component indication, the following applies.

If geometry d0 component is indicated, remove all PCC NAL units with PccNalUnitType not equal to GEOMETRY_D0.

Otherwise, if geometry d1 component is indicated, remove all PCC NAL units with PccNalUnitType not equal to GEOMETRY_D1.

Otherwise (texture component is indicated), remove all PCC NAL units with PccNalUnitType not equal to TEXTURE_NALU.

For each PCC NAL unit, remove the first byte.

Another embodiment is provided below.

In another embodiment of the first set of methods as summarized above, the PCC NAL unit header (e.g., the data unit header 404 in FIG. 4) is designed such that the codec used for coding of the geometry and texture components can be inferred from the PCC NAL unit type. For example, the PCC NAL unit header is designed as summarized below:

In the PCC NAL unit header, there is a type indicator, e.g., 7 bits, that specifies the type of content carried in the PCC NAL unit payload. The type is determined, for example, according to the following:

0: The payload contains an HEVC NAL unit
1: The payload contains an AVC NAL unit
2 . . . 63: Reserved
64: Group of frames header NAL unit
65: Auxiliary information NAL unit
66: Occupancy map NAL unit
67 . . . 126: Reserved PCC NAL units with PCC NAL unit type in the range of 0 to 63, inclusive, are referred to as video NAL units.

It is possible to use some of the reserved PCC NAL unit types for PCC Cat13 data units, thus unifying PCC Cat2 and PCC Cat13 into one standard specification.

Figure 5:
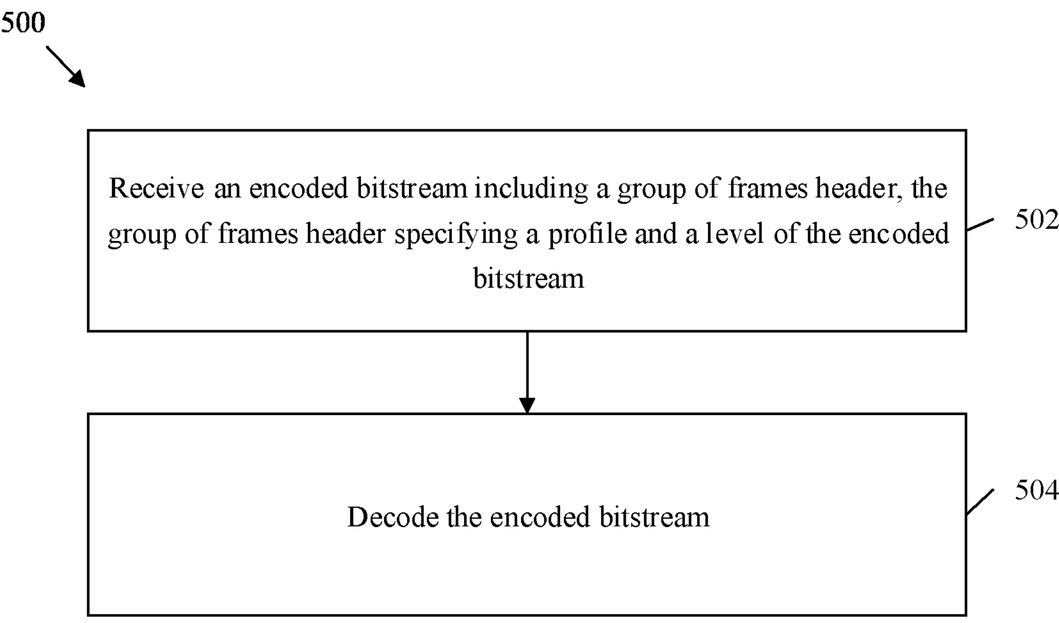
FIG. 5 is an embodiment of a method of point cloud coding implemented by a video decoder.

FIG. 5 is an embodiment of method 500 of point cloud coding implemented by a video decoder (e.g., video decoder 30). The method 500 may be performed to solve one or more of the aforementioned problems associated with point cloud coding.

In block 502, an encoded bitstream (e.g., the data structure 400) including a group of frames header (e.g., the group of frames header 408) is received. The group of frames header specifies a profile and a level of the encoded bitstream.

In block 504, the encoded bitstream is decoded. The decoded bitstream may be utilized to generate an image or video for display to a user on a display device.

In an embodiment, the group of frames header is a group of frames network abstraction layer (NAL) unit. In an embodiment, the group of frames header is configured to carry group of frames header parameters.

In an embodiment, at least one of occupancy information, geometry information, and attribute information are included in the group of frames header parameters. Each point of a PCC signal, in addition to having a 3D position, i.e., spatial attribute, may also be associated with a number of other attributes such as color, reflectance, surface normal, etc.

In an embodiment, the group of frames header specifies a profile and a level of for decoding auxiliary information for an occupancy map. In an embodiment, the group of frames header specifies a point cloud reconstruction process that utilizes decoding results of geometry, texture, auxiliary information, and occupancy map.

Figure 6:
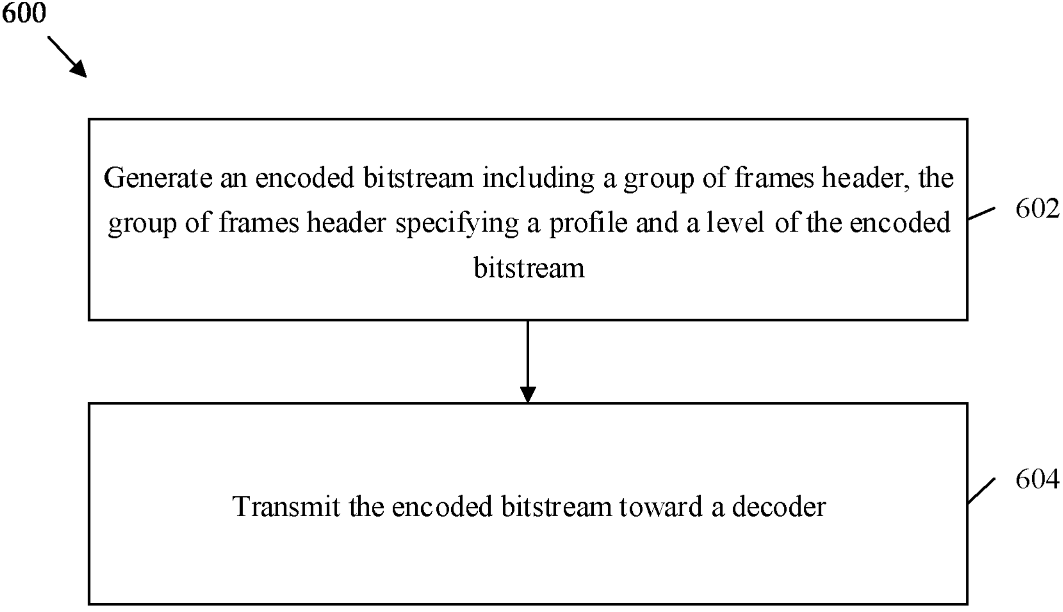
FIG. 6 is an embodiment of a method of point cloud coding implemented by a video encoder.

FIG. 6 is an embodiment of method 600 of point cloud coding implemented by a video encoder (e.g., video encoder 20). The method 600 may be performed to solve one or more of the aforementioned problems associated with point cloud coding.

In block 602, an encoded bitstream (e.g., the data structure 400) including a group of frames header (e.g., the group of frames header 408) is generated. The group of frames header specifies a profile and a level of the encoded bitstream.

In block 604, the encoded bitstream is transmitted toward a decoder (e.g., video decoder 30). Once received by the decoder, the encoded bitstream may be decoded to generate an image or video for display to a user on a display device.

In an embodiment, the group of frames header is a group of frames network abstraction layer (NAL) unit. In an embodiment, the group of frames header is configured to carry group of frames header parameters.

In an embodiment, at least one of occupancy information, geometry information, and attribute information are included in the group of frames header parameters. Each point of a PCC signal, in addition to having a 3D position, i.e., spatial attribute, may also be associated with a number of other attributes such as color, reflectance, surface normal, etc.

In an embodiment, the group of frames header specifies a profile and a level of for decoding auxiliary information for an occupancy map. In an embodiment, the group of frames header specifies a point cloud reconstruction process that utilizes decoding results of geometry, texture, auxiliary information, and occupancy map.

Figure 7:
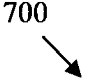
FIG. 7 is a schematic diagram of an example video coding device.
Figure 7:
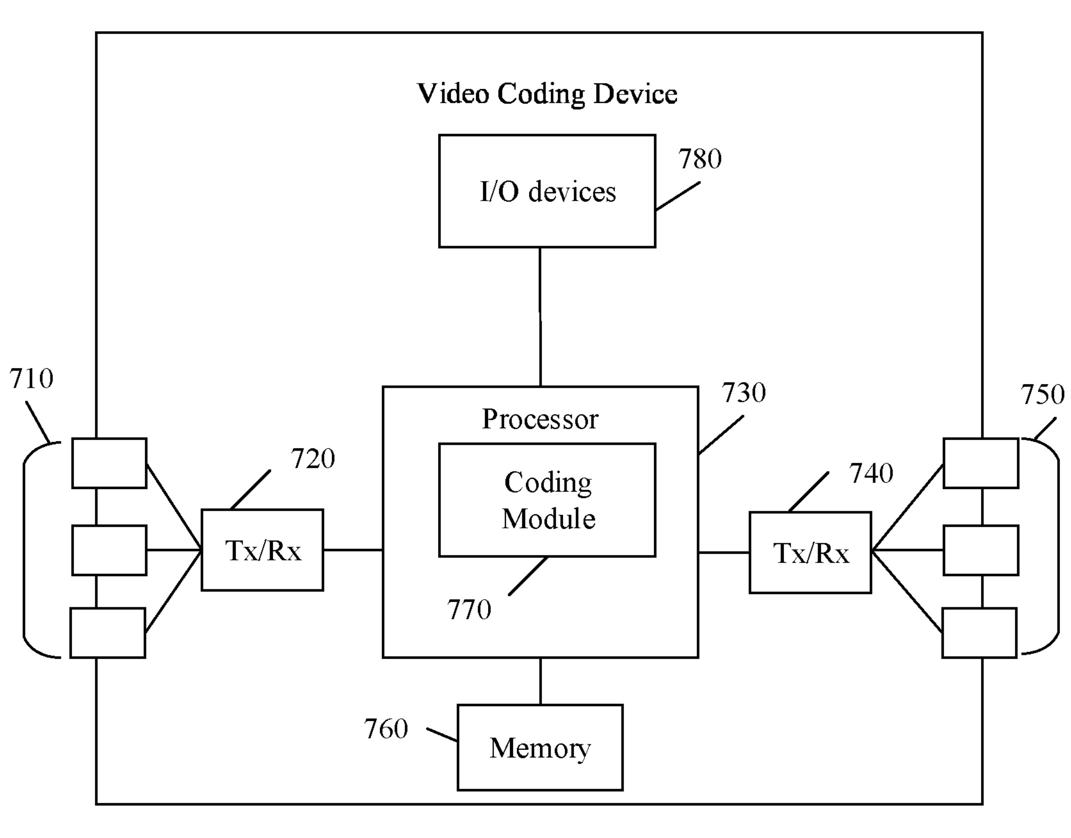

FIG. 7 is a schematic diagram of a video coding device 700 (e.g., a video coder 20, a video decoder 30, etc.) according to an embodiment of the disclosure. The video coding device 700 is suitable for implementing the methods and processes disclosed herein. The video coding device 700 comprises ingress ports 710 and receiver units (Rx) 720 for receiving data; a processor, logic unit, or central processing unit (CPU) 730 to process the data; transmitter units (Tx) 740 and egress ports 750 for transmitting the data; and a memory 760 for storing the data. The video coding device 700 may also comprise optical-to-electrical (OE) components and electrical-to-optical (EO) components coupled to the ingress ports 710, the receiver units 720, the transmitter units 740, and the egress ports 750 for egress or ingress of optical or electrical signals.

The processor 730 is implemented by hardware and software. The processor 730 may be implemented as one or more CPU chips, cores (e.g., as a multi-core processor), field-programmable gate arrays (FPGAs), application specific integrated circuits (ASICs), and digital signal processors (DSPs). The processor 730 is in communication with the ingress ports 710, receiver units 720, transmitter units 740, egress ports 750, and memory 760. The processor 730 comprises a coding module 770. The coding module 770 implements the disclosed embodiments described above. The inclusion of the coding module 770 therefore provides a substantial improvement to the functionality of the coding device 700 and effects a transformation of the video coding device 700 to a different state. Alternatively, the coding module 770 is implemented as instructions stored in the memory 760 and executed by the processor 730.

The video coding device 700 may also include input and/or output (I/O) devices 780 for communicating data to and from a user. The I/O devices 780 may include output devices such as a display for displaying video data, speakers for outputting audio data, etc. The I/O devices 780 may also include input devices, such as a keyboard, mouse, trackball, etc., and/or corresponding interfaces for interacting with such output devices.

The memory 760 comprises one or more disks, tape drives, and solid-state drives and may be used as an overflow data storage device, to store programs when such programs are selected for execution, and to store instructions and data that are read during program execution. The memory 760 may be volatile and non-volatile and may be read-only memory (ROM), random-access memory (RAM), ternary content-addressable memory (TCAM), and static random-access memory (SRAM).

Figure 8:
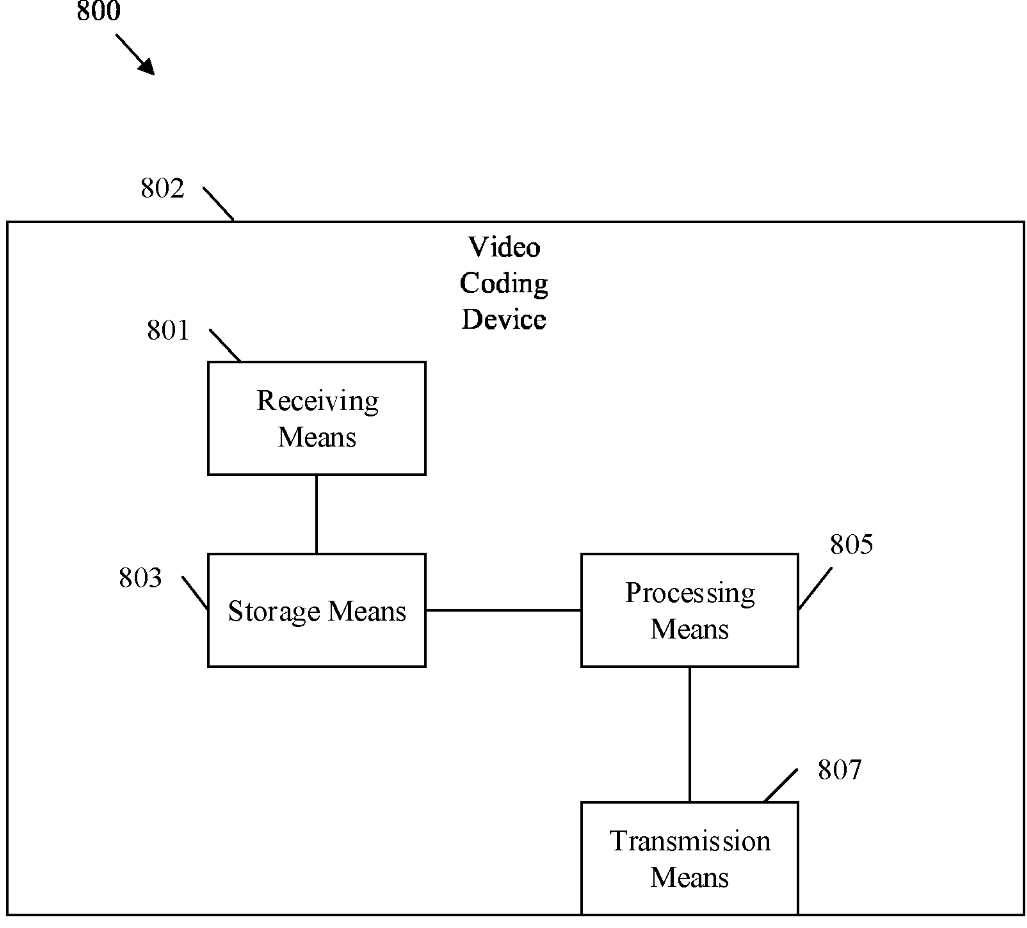
FIG. 8 is a schematic diagram of an embodiment of a means for coding.

FIG. 8 is a schematic diagram of an embodiment of a means for coding 800. In embodiment, the means for coding 800 is implemented in a video coding device 802 (e.g., a video encoder 20 or a video decoder 30). The video coding device 802 includes receiving means 801. The receiving means 801 is configured to receive a picture to encode or to receive a bitstream to decode. The video coding device 802 includes transmission means 807 coupled to the receiving means 801. The transmission means 807 is configured to transmit the bitstream to a decoder or to transmit a decoded image to a display means (e.g., one of the I/O devices 780).

The video coding device 802 includes a storage means 803. The storage means 803 is coupled to at least one of the receiving means 801 or the transmission means 807. The storage means 803 is configured to store instructions. The video coding device 802 also includes processing means 805. The processing means 805 is coupled to the storage means 803. The processing means 805 is configured to execute the instructions stored in the storage means 803 to perform the methods disclosed herein.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method of three dimensional (3D) presentation coding implemented by a decoding device, comprising:

receiving an encoded bitstream including a parameter set, the parameter set including a first syntax element specifying a profile for a three dimensional (3D) presentation reconstruction process and a second syntax element specifying a level for the 3D presentation reconstruction process, wherein the profile and the level indicate capabilities required for point cloud coding compatible with the 3D presentation reconstruction process; and decoding the encoded bitstream in accordance with the profile and the level.

2. The method of claim 1, wherein the profile is a specified subset of syntax or a specified subset of coding tools.

3. The method of claim 1, wherein the level is a defined set of constraints on values that may be taken by syntax elements and variables.

4. The method of claim 1, wherein a combination of the profile and the level for the encoded bitstream represents a particular decoding capability required for decoding of the encoded bitstream.

5. The method of claim 1, wherein the profile and the level indicates capabilities required for decoding of auxiliary information.

6. The method of claim 1, wherein the profile and the level indicates capabilities required for decoding of occupancy map components.

7. The method of claim 1, wherein the parameter set comprises a group of frames header, and wherein the group of frames header is a group of frames network abstraction layer (NAL) unit.

8. The method of claim 1, wherein the parameter set carries occupancy information.

9. The method of claim 1, wherein the parameter set specifies the profile and the level for decoding auxiliary information for an occupancy map.

10. The method of claim 1, wherein the parameter set carries geometry information.

11. The method of claim 1, wherein the parameter set carries attribute information.

12. A decoding device comprising a memory storing instructions and one or more processors, the one or more processors configured to execute the instructions to cause the decoding device to:

receive an encoded bitstream including a parameter set, the parameter set including a first syntax element specifying a profile for a three dimensional (3D) presentation reconstruction process and a second syntax element specifying a level for the 3D presentation reconstruction process, wherein the profile and the level indicate capabilities required for point cloud coding compatible with the 3D presentation reconstruction process; and decode the encoded bitstream in accordance with the profile and the level.

13. The decoding device of claim 12, wherein the profile is a specified subset of syntax or a specified subset of coding tools.

14. The decoding device of claim 12, wherein the level is a defined set of constraints on values that may be taken by syntax elements and variables.

15. The decoding device of claim 12, wherein a combination of the profile and the level for the encoded bitstream represents a particular decoding capability required for decoding of the encoded bitstream.

16. The decoding device of claim 12, wherein the profile and the level indicates capabilities required for decoding of auxiliary information.

17. The decoding device of claim 12, wherein the profile and the level indicates capabilities required for decoding of occupancy map components.

18. A non-transitory computer-readable storage medium storing a bitstream, the bitstream comprising video data and one or more syntax elements, the syntax elements used as instructions that describe how to reconstruct a point cloud by processing of the video data, the instructions executable by a video decoding device to perform steps:

wherein the bitstream further comprises:

a parameter set;

a first syntax element in the parameter set, the first syntax element specifying a profile for a three dimensional (3D) presentation reconstruction process; and a second syntax element in the parameter set, the second syntax element specifying a level for the 3D presentation reconstruction process, wherein the profile and the level indicate capabilities required for point cloud coding compatible with the 3D presentation reconstruction process.

* * * * *